Figure 3:
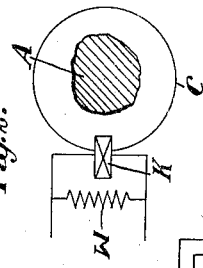

April 19, 1938.   S. STRAUSS ET AL   2,114,578
PULSE FREQUENCY AND INTENSITY METER
Filed Jan. 7, 1935

Inventors
Siegmund Strauss
Louis Heisglass
By
Sommers & Young
attys.

Patented Apr. 19, 1938

2,114,578

UNITED STATES PATENT OFFICE 2,114,578

PULSE FREQUENCY AND INTENSITY METER

Siegmund Strauss and Louis Weisglass, Vienna, Austria

Application January 7, 1935, Serial No. 790
In Austria January 18, 1934

4 Claims. (Cl. 128—2.05)

This invention has for its object to provide a reliable and effective device for indicating and/or measuring the frequency and, if desired, also the amplitude or intensity of impulses, more particularly of the blood circulation pulses of a human being or animal. For scientific purposes and particularly during surgical operations or other treatments in which a particularly heavy work has to be performed by the heart, it is of utmost importance for the surgeon to have a clearly intelligible indication of the condition of working of the heart and of the blood circulation. It is usual at present, to put an assistant in charge of the supervision of the pulse of the patient. But this kind of supervision is dependent upon the skill, attention and knowledge of the assistant and is always somewhat slow. It will not give the instantaneous warning sometimes required to save the patient's life. Moreover, the assistant is fully absorbed by watching the pulse and is not able to perform any other duty during the operation. It is not only important to count the number of pulses per time unit but also to watch the amplitude or volume of the individual beats and the regularity of their occurrence.

The device according to the invention gives a clearly visible indication of the frequency and if desired also of the amplitude or volume of the pulse. In a preferred embodiment of the invention, these two values may be directly read on the dials of electrical measuring instruments.

The human or animal pulse may be defined as a succession of surges of the blood pressure. Both the frequency of these surges and the volume of blood transported with each of these surges are of interest to the surgeon and both of these values are indicated by the apparatus according to the invention.

According to the invention, means are provided responsive to the variations of the blood pressure. Said means may comprise for instance a rubber compression bag or hose of well known design, acting by means of a diaphragm or the like on a piezo-electric crystal adapted to convert small movements into electrical impulses. Said crystal may be compressed or twisted in accordance with the variations of the blood pressure and thus caused to generate electricity. These electrical impulses are amplified by suitable amplifying means, e. g. electrical discharge tubes and the amplified impulses are used to operate an indicating device, such as an electrical measuring instrument or a glow tube. The impulses are thus made visible by the oscillating pointer of the instrument or by the luminous column or field of varying size of the glow tube. The deflection of the pointer or the size of the glow gives an indication of the amplitude of the impulses.

According to the invention, devices for directly indicating and measuring the frequency and/or magnitude of the impulses are provided, which will be described with reference to the accompanying drawing.

Figure 1:
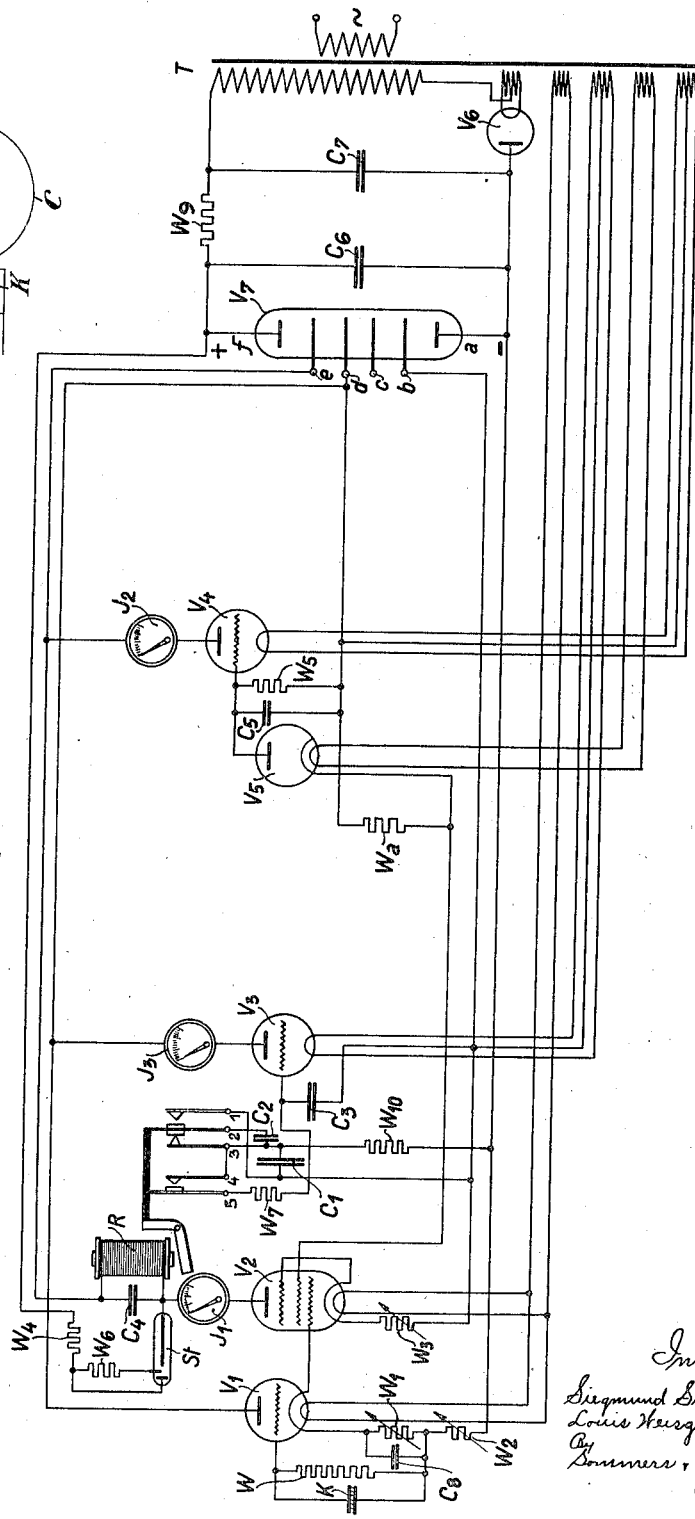

Fig. 1 of the drawing shows by way of example a circuit diagram of a complete installation operation from A. C. mains.

Fig. 2 shows diagrammatically in section the means applied to the arm of the patient for converting blood pressure pulsations into electrical impulses.

The crystal K is connected mechanically to an inflated hollow compression cuff C of known design embracing the arm A of the patient. The blood pressure pulsations in the blood vessels of said arm cause vibrations of the compressed air within the cuff C which are transmitted mechanically to the crystal K. Said crystal will, therefore, vibrate in synchronism with the pulse and generate electrical impulses corresponding to the pulse beats.

The piezo-electric crystal K (quartz, Rochelle salt etc.) responsive to the impulses is connected between the grid and cathode of a vacuum tube $V_1$, a shunt resistance W (grid leak) being provided to discharge the grid after each impulse. Appropriate grid bias is obtained by means of a resistance $W_1$ shunted by a condenser $C_8$ in the cathode lead. As the frequency of the impulses is comparatively low, a direct interstage coupling arrangement is provided to transmit the variations of the anode current of tube $V_1$ to the grid of the second tube $V_2$. In the example shown, the cathode of tube $V_2$ is kept at a fixed potential higher than the cathode potential of tube $V_1$ by connecting said cathode to point $b$ of a glow discharge potentiometer $V_7$. It is well known that this type of potentiometer maintains the voltage at its electrodes $a, b, c, d, e, f$ uniform and steady irrespective of varying load. Alternatively, an ordinary tapped resistance of comparatively low ohmic value may be employed. A resistance $W_2$ is provided in the cathode circuit of tube $V_1$ and the anode current of this tube causes a voltage drop in said resistance about equal to the potential of the cathode of tube $V_2$. The cathode of tube $V_1$ may be therefore directly connected to the control grid of tube $V_2$. A resistance $W_3$ in the cathode lead of tube $V_2$ is provided in order to control the amplification. The resistances $W_1$, $W_2$, $W_3$ are preferably adjustable to bring the normal anode current of tube $V_2$, indicated by the milliammeter $J_1$, down to zero or to any other predetermined value.

In the example shown, tube $V_2$ is a pentode but a tube of any other type, preferably one having a high amplification factor, may be employed in this stage.

The plate circuit of tube $V_2$ includes the coil of a relay R, the purpose of which will be described later. This relay is shunted by a condenser $C_4$ in order to obtain one single attraction of the armature with each impulse, even in the case of distorted wave form of the pulse, as it occurs in connection with certain diseases. Plate voltage is furnished to tube $V_2$ from the electrode $e$ of potentiometer $V_7$. The voltage drop of the plate current across said relay coil is used to operate a glow lamp $St$ having an auxiliary electrode and a plate connected to a high positive potential over resistances $W_4$ and $W_6$. The screen grid of tube $V_2$ is connected to point $d$ of the potentiometer tube $V_7$ over a resistance $W_a$ and the voltage drop across said resistance is utilized as will be fully described later on, to indicate and measure the magnitude of the pulses.

In operation, the resistances $W_1$, $W_2$ and $W_3$ are so adjusted that normally only a small current flows in the plate circuit of tube $V_2$. In this case, there is no appreciable voltage across relay R and the glow tube $St$ receives only the constant voltage between the electrodes $e$ and $f$ of potentiometer tube $V_7$. The luminous column in the glow tube $St$ has then a predetermined length. An electric impulse reaching the grid of tube $V_1$, for instance an electric impulse generated by the deformation of the piezo electric crystal K caused by a surge of the blood pressure, causes the plate current of tube $V_2$ to rise, and the voltage drop across relay R adds itself to the voltage between the electrodes of glow tube $St$, causing an extension of the luminous column in the glow tube $St$. Thus, each impulse causes a deflection of the pointer of instrument $J_1$, a clearly visible luminous indication in the glow tube $St$ and an attraction of the armature R.

In order to measure the frequency of the impulses or beats, a condenser $C_1$ is provided, connected over a resistance $W_{10}$ to the steady potential between the electrodes $a$ and $b$ of the potentiometer tube $V_7$. The condenser $C_1$ is slowly charged over said resistance $W_{10}$, the relation time to voltage being given, as it is well known to any expert, by the exponential curve. A condenser $C_2$ of preferably smaller value than condenser $C_1$ is provided, being normally short circuited by contacts 2 and 3 of the relay and bridged by contact 1 with each impulse across condenser $C_1$. In this way, the condenser draws with each impulse a certain amount of electricity from condenser $C_1$ and consequently, as the voltage applied to condenser $C_1$ over resistance $W_{10}$ is constant, a certain state of equilibrium is obtained, each frequency of the impulses corresponding to a certain voltage occurring across the plates of the condenser $C_1$. In order to measure this voltage without drawing current from said condenser, an electrostatic instrument may be employed but preferably a vacuum tube voltmeter is used, comprising the tube $V_3$ and the plate milliammeter $J_3$. A condenser $C_3$ is connected between filament (e. g. center tap of transformer secondary) and the grid of tube $V_3$ and said condenser receives, during the actuation of the relay R by means of the contacts 4 and 5 and a resistance $W_7$ the resulting voltage across condenser $C_1$, the other plate of said condenser $C_1$ being at the same potential as the filament of tube $V_4$. The condenser $C_3$ and resistance $W_7$ serve to flatten out the small variations of the voltage which may take place while the relay R remains in the actuated position. The higher the resulting potential across condenser $C_1$, i. e. the lower the frequency of the pulsations, the lower the anode current of tube $V_3$ will drop, according to the rising negative grid potential across condenser $C_3$. Therefore the deflection of the pointer of the instrument $J_3$ gives a direct reading of the frequency of the pulsations.

The screen grid current of tube $V_2$ is utilized as has been already mentioned, for the measurement of the magnitude of the pulsations. The screen grid current of a pentode or like tube varies, as it is well known, between certain limits in a similar manner as the plate current with the grid potential. The voltage drop across the resistance $W_a$ connecting the screen grid of tube $V_2$ with the point $d$ of the potentiometer tube $V_7$ will be, therefore an amplification of the impulses applied to the grids of tubes $V_2$ and $V_1$. A two electrode rectifying tube $V_5$ is provided to charge the condenser $C_5$ shunted by a high resistance $W_5$ up to the peak value of the voltage drop across $W_a$, this peak voltage being a measure of the amplitude of the impulses. The three electrode tube $V_4$ will act in a well known manner as a vacuum tube voltmeter and the plate milliammeter $J_2$ will indicate the potential across $C_5$. The higher the amplitude of the impulses and consequently the voltage peaks across resistance $W_a$, the higher will be the negative charge of the condenser $C_5$ and the lower the deflection of the pointer of instrument $J_2$. These deflections are a direct measure of the volume of blood transported with each blood pressure surge or pulse and are not affected by slow changes in the pressure of the inflated rubber hose or like apparatus used for the application of the pulse responding means, e. g. the piezo electric crystal.

In the example shown in the drawing, the apparatus is operated from A. C. mains, a transformer T having a number of secondaries being employed to furnish the filament and plate currents. A usual half-wave rectifier tube $V_6$ and a filtering arrangement $C_7$, $W_9$, $C_8$ are used to supply the potentiometer $V_7$ with direct current. The device may as well be operated from batteries or D. C. mains and the necessary alterations will be evident to anybody skilled in the art.

Other changes may be made without departing from the spirit of the invention, for instance tube $V_2$ may be replaced by two tubes the control grids of which are arranged in parallel, the plate circuit of one tube comprising instrument $J_1$, tube $St$ and resistance R and the plate circuit of the other tube comprising the resistance $W_a$. Contact voltmeters or other electrical measuring instruments having contacts operated by the pointer or relays operating at a certain predetermined current may be used in the place or in connection with the instruments $J_3$ and $J_2$, the contacts of said contact instruments or relays being suitably arranged in circuits to give a visible or audible signal if the frequency or magnitude of the impulses drops below or rises beyond a certain predetermined value.

What we claim is:—

1. In apparatus for measuring the frequency of the human pulse, in combination, means for converting the blood pressure pulsations into electrical impulses, said means comprising a piezo-electric crystal adapted to be deformed by the blood pressure pulsations, means comprising a relay responsive to said electrical impulses, a first condenser, a source of electricity of constant voltage, means including a resistance for connecting the condenser with said source of electricity, a second condenser, means comprising the contacts of said relay means to bridge the second condenser across the first condenser on the occurrence of each impulse and to discharge said second condenser as the relay is restored to normal position and means for measuring the potential of said first condenser, substantially without discharging the same during the measurement.

2. In apparatus for measuring the frequency of the human pulse, in combination, means for converting the blood pressure pulsations into electrical impulses, said means comprising a piezo-electric crystal adapted to be deformed by the blood pressure pulsations, a directly coupled two-stage vacuum tube amplifier, means connecting the cathode of the first tube directly to the control grid of the second tube, means for supplying to the input circuit of said amplifier the electrical impulses generated by said crystal, relay means in the plate circuit of the second tube of said amplifier, a first condenser, a source of electricity of constant voltage, means including a resistance, said resistance for connecting said condenser with said source of electricity, a second condenser, means comprising the contacts of said relay means to bridge the second condenser across the first condenser on the occurrence of each impulse and to discharge said second condenser as the relay is restored to normal position, and means for measuring the potential of said first condenser, substantially without discharging the same during the measurement.

3. In apparatus for measuring the frequency of the human pulse, in combination, means for converting the blood pressure pulsations into electrical impulses, said means comprising a piezo-electric crystal adapted to be deformed by the blood pressure pulsations, means comprising a relay responsive to said electrical impulses, a first condenser, a source of electricity of constant voltage, means including a resistance, said resistance for connecting said condenser with said source of electricity, a second condenser, means comprising the contacts of said relay means to bridge the second condenser across the first condenser on the occurrence of each impulse and to discharge said second condenser as the relay is restored to normal position, a vacuum tube, a third condenser arranged between the cathode and control grid of said tube and bridged across the said first condenser in series with a resistance and having a contact closed at each actuation of said relay means, and an electrical measuring instrument directly indicating the number of pulses per time unit in the plate circuit of said vacuum tube.

4. In apparatus for measuring the frequency of the human pulse, in combination, means converting the blood pressure pulsations into electrical impulses, said means comprising a piezo-electric crystal adapted to be deformed by the blood pressure pulsations, a vacuum tube amplifier, means for supplying the electrical impulse generated by said crystal to the input circuit of said amplifier, said amplifier having two output circuits, relay means in the first output circuit of said amplifier, said relay having contacts, a source of electricity of constant voltage, a first condenser, means including a resistance connecting said condenser with said source of electricity, a second condenser, means comprising contacts of said relay means to bridge the second condenser across the first condenser on the occurrence of each impulse and to discharge said second condenser as the relay is restored to normal position, a resistance, a vacuum tube, a third condenser, means connecting said third condenser between the cathode and control grid of said vacuum tube and bridging said third condenser across the said first condenser in series with said resistance, a contact being closed at each actuation of said relay means, and an electrical measuring instrument directly indicating the number of pulses per time unit in the plate circuit of said vacuum tube, a rectifier connected to the second output circuit of said amplifier, a vacuum tube amplifier, said rectifier being arranged in the input circuit of said vacuum tube amplifier, and an electrical measuring instrument directly indicating the intensity of the pulse in the plate circuit of said last amplifier.

SIEGMUND STRAUSS.
LOUIS WEISGLASS.